United States Patent [19]

Kenny

[11] 4,016,901
[45] Apr. 12, 1977

[54] THERMOSTATIC VALVE

[75] Inventor: Thomas M. Kenny, Paoli, Pa.

[73] Assignee: Ogontz Controls Company, Willow Grove, Pa.

[22] Filed: June 23, 1975

[21] Appl. No.: 589,089

[52] U.S. Cl. .................. 137/340; 236/56; 236/99 C

[51] Int. Cl.² ........................ F16K 49/00

[58] Field of Search ............... 236/56–60, 236/99 C, 99 E; 237/13, 80; 137/340; 251/77

[56] References Cited

UNITED STATES PATENTS

| | | | |
|---|---|---|---|
| 1,694,641 | 12/1928 | Crosby | 236/56 |
| 2,229,529 | 1/1941 | Smith | 236/56 |
| 2,914,251 | 11/1959 | Morgan | 236/56 |
| 3,096,936 | 7/1963 | Woods | 236/56 |
| 3,118,648 | 1/1964 | Campbell | 251/77 |
| 3,845,932 | 11/1974 | Fontaine | 251/77 X |

Primary Examiner—William E. Wayner
Assistant Examiner—William E. Tapolcai, Jr.
Attorney, Agent, or Firm—Richard D. Weber

[57] ABSTRACT

A fluid temperature actuated valve for trapping fluids in a system, having particular utility as a steam trap. The valve is closed by the expansion of a wax pellet type thermal actuator working against the valve opening force of an operating spring. The valve may be provided with an ambient sensing on-off control in the form of an air temperature responsive actuator which is coupled to the fluid sensing actuator by a suitable insulator. The air sensing actuator upon the occurrence of a predetermined ambient temperature condition will displace the fluid sensing actuator a sufficient degree to prevent the opening of the valve. The valve with the ambient sensing control may be employed as the only control on a steam tracer line, serving the dual function of a steam trap as well as an on-off control response to the ambient temperature.

8 Claims, 3 Drawing Figures

THERMOSTATIC VALVE

The present invention relates generally to temperature responsive valve mechanisms and relates more particularly to a novel valve construction particularly suited for use as a steam trap and wherein the thermostatic actuator thereof undergoes a solid-liquid phase change during valve actuation. In one embodiment of the invention, the valve actuator is linked to an ambient air temperature sensor which moves the valve to a closed inoperative position when the ambient air rises above a predetermined temperature.

There are many different types of temperature responsive fluid valves, particularly in the field of steam traps. The most commonly used mechanism heretofore employed for actuating a valve member in response to temperature change of the fluid adjacent the valve has probably been the bellows type actuator which typically comprises an expansible bellows containing a liquid which will partially change to the vapor state and expand the bellows to close on the open valve when the fluid reaches a predetermined temperature.

Although the bellows type of thermostatic value has enjoyed widespread use, it is subject to a number of operating limitations and disadvantages. A major difficulty is the relatively short life span of the bellows type actuator which is due to the repeated flexing and eventual failure of the thin bellows walls and is aggravated by operation under pressure and corrosive conditions. The length of the bellows actuating stroke can also effect the expected useful life of the bellows, the longer stroke causing the greater stresses and shortening the life of the actuator. In addition, the poor manufacturing tolerances of bellows actuators result in poor repeatability and an unpredictable life expectancy. The bellows actuator is further affected by the pressure acting externally on the bellows casing, and the expansion stroke of the bellows is accordingly a function of not only the temperature but also the pressure of the medium within which the bellows actuator is immersed.

In the present invention, the actuator undergoes a solid-liquid phase change during expansion to close the valve, working against the valve opening force of an operating spring. The movable valve element comprises a cage having the valve element at the lower end thereof for cooperative engagement with a valve seat. A compression coil spring acts on the cage to urge the valve into an open position. The actuator, preferably of the wax pellet type, is disposed within the valve body for expansion upon heating by the fluid within the valve casing. The actuator is engaged at one end with the valve body and the other end is operatively connected with the cage by means of an overtemperature compression spring having a higher spring rate than the operating spring. The cage will accordingly move with the actuator during expansion or contraction except for actuator expansion after valve closure upon which occurrence the over-temperature spring will compress to accommodate any further expansion of the actuator and permit telescopic movement of the actuator within the cage.

In one embodiment of the invention, an ambient sensing control is added to the described valve and serves as an on-off switch to deactivate the valve in a closed position upon the occurrence of a predetermined ambient temperature condition. The embodiment includes an insulated connector extending from the end of the actuator normally in engagement with the valve body to a second actuator responsive to air temperature changes spaced outboard of the valve and exposed to ambient conditions. The expansion of the second actuator upon the occurrence of a predetermined ambient temperature holds the valve closed regardless of the temperature of the fluid within the valve. This embodiment is particularly adapted for use with steam tracer lines as the sole mechanism needed for automatic control of steam flow. Connected at the opposite end of the tracer line from the steam source, the valve with ambient sensing control will automatically operate as a steam trap during the ambient temperature conditions which require a steam flow to prevent freezing of a process line. The steam from a suitable source is continuously directed into the tracer line but flow will occur only as needed, thereby effecting substantial savings over conventional systems.

It is accordingly a first object of the present invention to provide a thermostatic valve of a novel construction which is particularly suited for use as a steam trap.

A further object of the invention is to provide a valve as described wherein the valve thermostatic actuator is characterized by a solid medium which changes to the liquid phase upon heating, and including means for accommodating the expansion of the actuator beyond that required to close the valve.

Another object of the invention is to provide a valve as described having an ambient sensing on-off control which effectively closes the valve and prevents further valve operation upon the occurrence of a predetermined ambient temperature condition.

Still another object is to provide a steam trap having an ambient sensing control which may be used at the end of a steam tracer line to control steam flow in accordance with ambient conditions.

A further object of the invention is to provide a thermostatic valve as described which is capable of operation under relatively high pressure with minimal effect on valve operation and life expectancy.

Another object of the invention is to provide a thermostatic valve as described of a simple, rugged construction which can be economically manufactured.

Additional objects and advantages of the invention will be more readily apparent from the following detailed description of an embodiment thereof when taken together with the accompanying drawings wherein.

Figure 1:
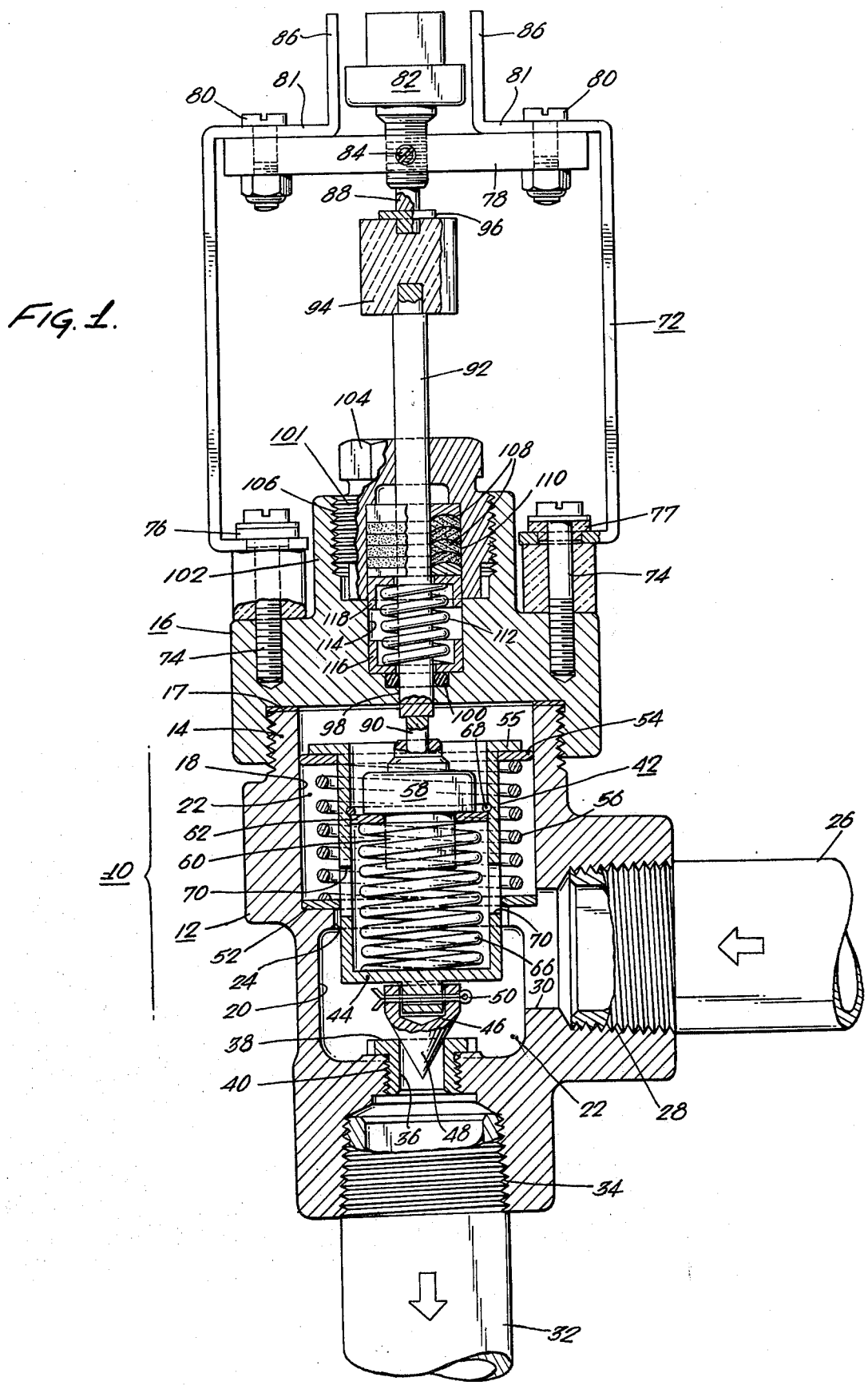
FIG. 1 is a longitudinal sectional view taken through a thermostatic valve having an ambient sensing on-off control in accordance with the present invention.

Referring to the drawings and particularly FIG. 1 thereof, a thermostatic valve in the form of a steam trap having ambient sensing control in accordance with the present invention is generally designated 10. The valve includes a hollow valve body 12 having a threaded neck portion 14 to which is connected a valve cap 16 sealed by gasket 17. A cylindrical bore 18 in the valve body 12 coaxial with the neck portion 14 and valve cap 16 defines along with a coaxial inner bore 20 of slightly smaller diameter a closed valve chamber generally designated 22, into which protrudes an annular shoulder 24 of the valve body. A steam inlet conduit 26 is threadedly connected with a port 28 of the valve body 12 which opens through passage 30 into the valve body chamber 22. A condensate outlet conduit 32 is similarly threadedly connected with a port 34 of the valve body 12 which communicates with the chamber 22 through a central bore 36 of a valve seat 38 which is secured within a threaded bore 40 of the valve body. The bore 36 of the valve seat is coaxially aligned with the bore 18 of chamber 22.

A cylindrical hollow cage 42 is disposed within the valve body chamber 22 for axial movement therewithin. The cage 42 is open at its upper end and is closed by end member 44 at its lower end from which downwardly extends a coaxial stud 46. A valve closing element in the form of a conical valve plug 48 is attached to the stud 46 by a cotter pin 50 passing through aligned holes in the plug and stud. The plug 48 is adapted to extend into the bore 36 of the valve seat 38 and, in the lowermost position of the cage 42, closes the bore 36 to prevent fluid flow into the drain conduit 32. The cage 42 is maintained in coaxial alignment with the valve seat 38 by a guide ring 52 on the shoulder 24 and by a similar guide ring 54 on the cage beneath a flange 55 at the upper end thereof. An operating coil spring 56 is disposed in compression around the cage 42 and extends between the rings 52 and 54 to urge the cage upwardly toward an open valve position.

Figure 3:
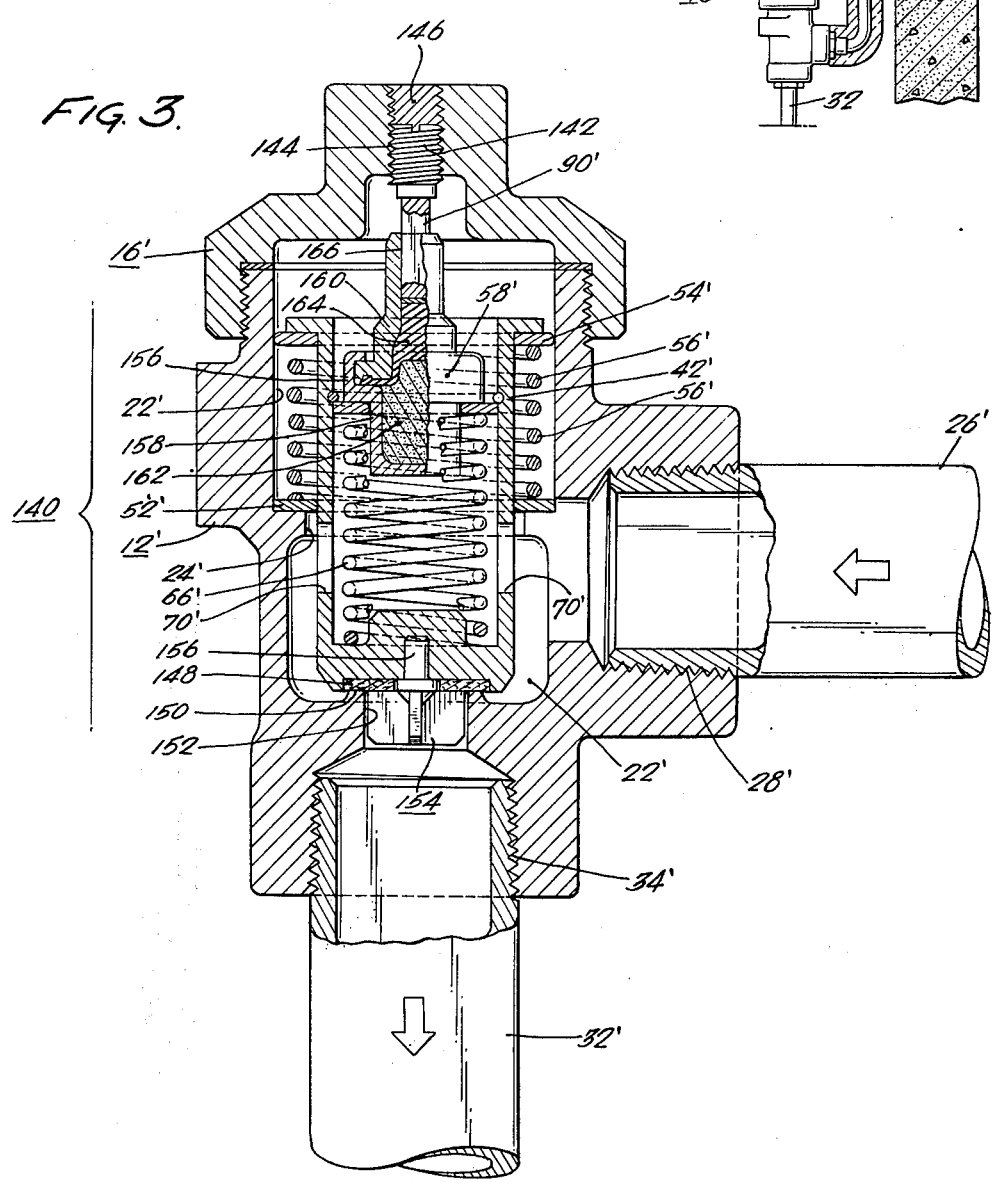
FIG. 3 is a sectional view illustrating a thermostatic valve in accordance with the present invention without the ambient sensing control.

A thermal actuator 58 of the solid-liquid phase change type described in more detail in connection with the embodiment of FIG. 3 is disposed within the hollow cage 42 with a cylindrical portion 60 thereof extending through a bore in a ring 62 which is slidable within the hollow cage 42 and maintains a coaxial disposition of the actuator within the cage. A shoulder 64 of the actuator bears against the upper face of the ring 62 while an over-temperature spring 66 seated on the bottom member 44 of the cage, bears against the underside of the ring 62. A snap ring 68 disposed within a groove on the interior of the cage limits the upward travel of the ring 62 and establishes a normal operating position of the actuator with respect to the cage 42 is illustrated in FIG. 1. The over-temperature spring 66 has a substantially stiffer spring rate than the operating spring 56 and hence the over-temperature spring will compress to permit travel of the actuator and ring 62 with respect to the cage only after the cage has traveled to its lowermost point with the plug 48 firmly seated in the valve seat 38 as shown in FIG. 1. Apertures 70 in the cage permit fluid within the chamber 22 to circulate through the cage and thereby cause an expansion or contraction of the thermal actuator 58 upon fluid temperature change.

A yoke 72 extends upwardly from the valve cap 16, being secured thereto by screws 74 passing through insulating washers 76 and 77. A cross member 78 having suitable insulating characteristics is attached by bolts 80 to inwardly directed elements 81 of the yoke. An ambient air sensing actuator 82 preferably of the same type as actuator 58 is secured to the cross member 78 by locking screw 84 in coaxially alignment with the actuator 58. Upwardly extending arms 86 of the yoke 72 spaced from the actuator 82 provide protection for the actuator.

An insulated connection is provided between a piston 88 of the actuator 82 and a piston 90 of the actuator 58. This connection comprises a valve stem 92 in engagement with piston 90 at its lower end and joined to an insulator 94 at its upper end. A wearplate 96 on the upper surface of insulator 94 bears against the piston 88 of actuator 82. Since the actuator 58 is constantly urged in an upward direction by the operating spring 56 acting through the cage 42 and the over-temperature spring 66, the stem 92 will be in continuous engagement with the actuator piston rod 90 and similarly the wearplate 96 will continuously engage the piston rod 88.

Seal means are provided to seal the entrance of the valve stem 92 into the chamber 22 through the valve cap. The stem 92 passes through a coaxial bore 98 in the valve cap 16, passing through an O-ring seal 100 in a suitable counterbore in bore 98. A packing gland 101 is provided within a neck portion 102 of the valve cap 16 and includes a hollow packing gland nut 104 which is threadedly received within a bore 106 of the valve cap neck portion 102. A series of packing rings 108 disposed within a bore 110 of the nut 104 are axially compressed upon the seating of the nut by the action of a compression spring 112 disposed within a counterbore 114 of the valve cap bore 98. The spring 112 extends between a cup shaped spring seat 116 at its lower end at the bottom of the counterbore 114, and a similar spring seat 118 at its upper end bearing against the lowermost packing ring 108.

The operation of the steam trap with ambient sensing control illustrated in FIG. 1 is as follows. With the conduit 26 connected with the steam line to be drained of condensate, and the conduit 32 connected with a suitable return or drain for the condensate, the chamber 22 will fill with the steam and/or condensate from the conduit 26. The actuator 58 will be exposed to the fluid in the chamber 22 and the extension of its piston rod 90 will be governed by the temperature of the fluid within the chamber 22. The axial movement of the cage 42 and hence the position of the plug 48 with respect to the valve seat bore 36 is normally governed by the operation of the actuator 58 in accordance with the temperature of the steam or condensate within the chamber 22. However, the displacement of the cage derived from movement of the actuator 58 is based upon the position of the stem 92 which by connection with the actuator 82 is dependent upon the ambient air temperature. With proper selection of the actuator 82 and the actuator position on the cross member 78, the actuator will operate to close and prevent the further opening of the valve upon the occurrence of a predetermined ambient temperature. Upon the reaching of such a temperature, the expansion of the actuator 82 provides a downward displacement of the stem 92, actuator 58 and cage 42 sufficient to close the valve plug 48 into sealing engagement with the valve seat bore 36 regardless of the degree of expansion or contraction of actuator 58. Under this circumstance, the actuator 58 will usually be displaced downwardly with respect to the cage 42, in which case the over-temperature spring 66 would be compressed and the ring 62 would drop away from its upper limit snap ring 68. In this condition, the further expansion or contraction of the actuator 58 would have no effect on the position of the cage 42 and the dependent valve plug 48. The actuator 82 accordingly acts as an automatic on-off switch for the steam trap, effectively converting the trap to a valve upon the occurrence of a predetermined ambient air temperature condition.

When the ambient temperature drops below the predetermined level, the piston 88 will retract, permitting an upward movement of the valve stem 92 under the force of either one or both of the springs 56 and 66. Upon a sufficient retraction of the stem 92, the actuator 58 will be in a position to function normally to carry out its steam trap function of releasing condensate from the chamber 22 by opening the valve until steam replaces the condensate in the chamber and expands the actuator to again seat the valve plug against the valve seat. Since as indicated the preferred form of actuator for both the fluid sensing actuator 58 and the ambient sensing actuator 82 comprises the solidliquid phase change type such as that characterized by an expansible wax pellet, provision must be made for continued expansion of the actuators after the valve has been closed. As indicated above, the over-temperature spring 66 and the permissible telescopic movement of the actuator 58 within the cage 42 carries out this function. In the event of further expansion of either actuator with the valve in the seated position shown in FIG. 1, the over-temperature spring will be compressed and the actuator 58 will move downwardly within the cage 42, the ring 62 sliding downwardly away from the stop ring 68. The actuator 58 and the ring 62 will return to the position shown in FIG. 1 upon contraction of either actuator before the valve will open.

Figure 2:
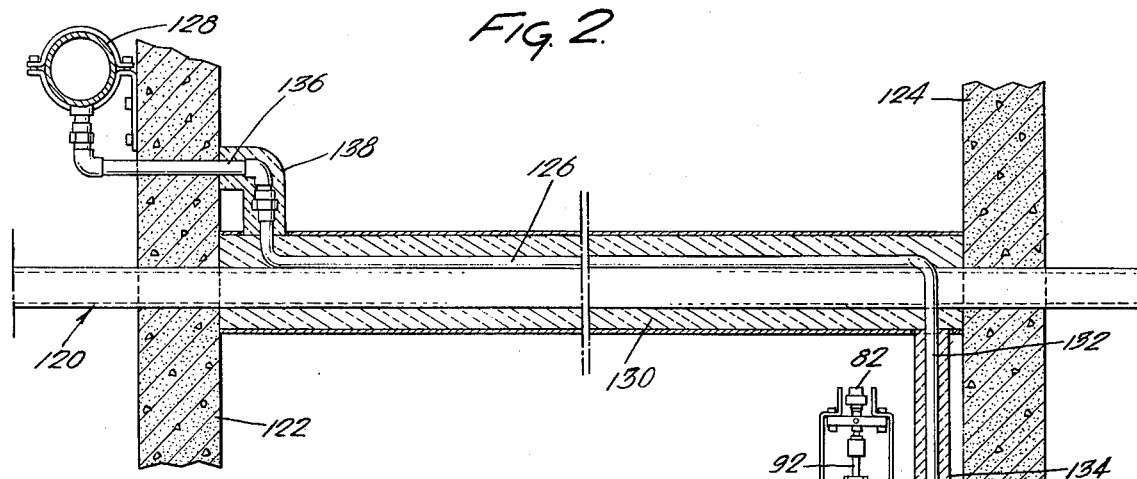
FIG. 2 is an interrupted sectional elevational view showing a process line equipped with a steam tracer line system which is automatically controlled by means of the valve with ambient sensing control as shown in FIG. 1.

With reference to FIG. 2, a typical application of the steam trap with ambient sensing control shown in FIG. 1 is illustrated. In FIG. 2, a process pipe 120 is shown passing outdoors between the exterior walls 122 and 124 of spaced buildings. To prevent the freezing of the material passing through the process pipe 120 during periods of cold weather, a steam tracer line 126 is disposed along the process pipe 120 in contact therewith and serves to carry steam from a steam source 128, in this case a header for supplying a plurality of such tracer lines. The process pipe and the tracer line are enclosed within a suitable blanket of insulating material 130 to minimize heat loss to the atmosphere. At the end of the steam tracer line remote from the steam source 128, the present steam trap 10 with ambient sensing control is connected to serve as the sole control for automatically regulating the flow of steam and serving to remove the condensate during periods of steam flow. The ambient sensing control, for example, might be set to close the valve when the temperature exceeded 45° F and to permit normal steam trap operation of the valve when the temperature drops below 45° F. During warm weather, the tracer line 126 would accordingly fill with condensate and there would be no heating of the process pipe even though the tracer line was still connected to the steam source 128. Upon a drop in temperature below 45° F, the ambient sensing actuator would allow the upward movement of the stem 92 until the actuator 58 was again in the normal operating position. The presence of the cold condensate within the chamber 22 would result in a contraction of the actuator 58, the upward movement of cage 42 under the influence of operating spring 56, and an opening of the plug 48 from the valve seat 38. The condensate would accordingly drain through the conduit 32 until live steam traveled through the length of the tracer line 126 and reached the valve chamber 22 whereupon the actuator 58 would expand under the influence of the high temperature steam and close the valve. The valve would continue to function as a steam trap, opening to drain condensate but closing to trap the steam until such time as the ambient temperature should again rise above the 45° F level of the chosen example. At that point, the expansion of the actuator 82 would produce a downward movement of the stem 92 sufficient to nullify any contractual movement of the actuator 58, thereby effectively inactivating the steam trap and preventing any further discharge of condensate. The steam in the tracer line 126 would then gradually be cooled and condense.

The end 132 of the tracer line extending from the process pipe 120 to the valve 10 is also provided with insulation 134 to minimize the possibility of condensation due to exposure of this section. The exposed lead-in portion 136 of the tracer line connected with the steam source is similarly provided with insulation 138 to minimize heat loss in this area.

From the illustration of FIG. 2, it will be recognized that the present steam trap with ambient sensing control provides a considerably simplified system for the control of steam flow through a tracer line than the conventional arrangement which requires s steam trap at the remote end of the line in addition to a control valve at the beginning of the line to regulate the flow of steam. The present invention accordingly provides significant advantages both in terms of the amount and cost of equipment and the cost of installation.

In FIG. 3, a further embodiment of the invention is illustrated comprising a steam trap generally designated 140 which does not include an ambient sensing control. In view of the fact that the steam trap 140 is nearly identical in structure and operation with the trap portion of the fully described embodiment of FIG. 1, the corresponding parts thereof bear the same identifying numerals with a prime suffix. To avoid repetition, only those areas of the steam trap 140 which differ from the embodiment of FIG. 1 will be discussed in detail.

The primary departure from the embodiment of FIG. 1 is the elimination of the ambient sensing control and the valve stem for establishing the operating position of the actuator 58. In the steam trap 140, the piston 90' of actuator 58' bears against an adjustment screw 142 in a threaded bore 144 of the valve cap 16'. The screw 142 is initially set during the calibration of the valve, and the bore 144 above the screw 142 is then filled with a plug 146 to lock the screw in the calibrated position. The movement of the cage 42' will accordingly result solely from the expansion or contraction of the actuator 58' in response to the temperature conditions of the fluid within the chamber 22'.

The only other significant structural difference between the steam trap 140 and the trap shown in FIG. 1 is the detail of the valve plug and valve seat. In the steam trap 140, the valve closing element comprises a washer 148 of resilient material disposed within a counterbore of the cage 42'. The washer 148 in the closed position of the trap illustrated in FIG. 3 engages an annular valve seat 150 formed as an integral part of the trap body 12' with a discharge bore 152 passing coaxially therethrough. A guide element 154 secured by a stud portion 156 thereof extending upwardly into the cage 42' secures the washer 148 in position and prevents any misalignment of the cage and valve seat during axial movement of the cage.

The details of the solid-liquid phase type actuator 58' are shown in the partial sectional view thereof in FIG. 3 which also illustrates the preferred type of actuator for the ambient sensing valve shown in FIG. 1. The actuator 58' comprises a hollow body 156 formed of body portions 158 and 160. A wax pellet 162 within the hollow body expands against the resilient plug 164 which in turn acts against the piston 90' to move the piston axially along a bore 166 of the body portion 160. A suitable diaphragm (not shown) between the wax and the plug prevents the leakage of the wax from the body chamber.

The wax pellet actuator of the type illustrated is a known device for producing mechanical movement in response to changes in temperature. Other types of actuators employing a solid expansion medium which is converted to the liquid phase during expansion may also be employed including the "squeeze" type wax actuator wherein the piston is surrounded by a resilient boot which in turn is surrounded by a wax pellet. The expansion of the pellet serves to compress the boot and provide a squeezing action which moves the piston axially.

The wax pellet type actuator is particularly advantageous for use in high pressure steam traps since the pressure has no significant effect on the life of the actuator. There being little stress on the moving parts of the wax element actuators, the predictable lifespan is extremely long and is uneffected by the stroke length or temperatures to which the actuator is subjected. Since manufacturing tolerences can be held very close, the repeatability of the wax pellet actuators is excellent. The power derived from the wax type actuator is far greater than that of the bellows actuator due to the non-compressible nature of the expanding medium. Although provision must be made for the over-expansion of the wax type actuator upon valve closure, the present valve structure readily accommodates this over-expansion by permitting a telescoping of the actuator within the cage.

Manifestly, changes in details of construction can be effected by those skilled in the art without departing from the spirit and scope of the invention.

I claim:

1. A thermostatic valve with ambient sensing on-off control comprising a valve body, a closed chamber within said body, an inlet port in said body for connecting said chamber with a fluid source, an outlet port in said body for draining fluid from said chamber, a valve seat communicating with said outlet port, a valve closing element adapted for movement toward and away from said valve seat, a thermostatic actuator within said chamber connected with said valve closing element to provide movement thereof toward said valve seat upon an increase in temperature of the fluid within said chamber, spring means biasing said valve closing element away from said valve seat, an ambient air temperature responsive actuator, means for supporting said ambient air responsive actuator outside of said body in spaced insulated relation thereto, and means connecting said ambient air responsive actuator with said actuator within said chamber to effect an engagement of said valve closing element against said valve seat upon occurrence of a predetermined ambient air temperature.

2. The invention as claimed in claim 1 wherein said fluid temperature responsive actuator within said chamber and said ambient air temperature responsive actuator comprise an expansible medium changing from the solid to the liquid state upon increase in temperature.

3. The invention as claimed in claim 2 wherein each said actuator comprises a wax pellet type actuator.

4. The invention as claimed in claim 2, including means for accommodating the over-expansion of said actuators upon engagement of said valve closing element with said valve seat, said latter means comprising a second spring means permitting telescopic movement of said actuator with respect to said valve closing element.

5. The invention as claimed in claim 1 wherein said valve closing element is attached to a cage disposed for sliding movement within said chamber toward and away from said valve seat, said spring means comprising an operating compression spring extending between said body and said cage, said actuator being disposed within said cage and being connected thereto by means of an over-temperature spring having a spring rate greater than said operating spring whereby said actuator may move telescopically with respect to said cage upon the seating of said valve closing element against said valve seat.

6. A system for automatically preventing the freezing of a process pipe, said system comprising a steam source, a tracer line adjacent said process pipe connected at one end of said steam source, an insulating layer surrounding said tracer line and pipe, and a steam trap with ambient sensing on-off control at the end of said tracer line remote from said steam source, said steam trap with ambient sensing on-off control comprising an internal thermostatic actuator for opening and closing said trap responsive to fluid temperature conditions within said trap, and an external ambient air temperature responsive actuator for closing said trap when the ambient air temperature exceeds a predetermined temperature level.

7. The invention as claimed in claim 6 wherein said internal and external actuators each comprise a wax pellet type actuator.

8. A steam trip with ambient sensing on/off control comprising a body, a closed chamber within said body, an inlet port in said body for connecting said chamber with a source of steam, an outlet port in said body for draining condensate from said chamber, a valve seat communicating with said outlet port, a valve closing element adapted for movement toward and away from said valve seat, a thermostatic actuator within said chamber connected with said valve closing element to provide movement thereof toward said valve seat upon an increase in temperature of the fluid within said chamber, said actuator comprising an expansible medium changing from the solid to the liquid state upon increase in temperature of the fluid within said chamber, spring means biasing said valve closing element away from said valve seat, means for accommodating the over-expansion of said actuator upon engagement of said valve closing element with said valve seat, an ambient air response actuator disposed exteriorly of said body, and means connecting said ambient air responsive actuator with said thermostatic actuator within said chamber to cause a displacement of said latter actuator and said valve closing element in response to changes in ambient air temperature, said ambient air responsive actuator being adapted to engage said valve closing element with said valve seat upon the occurrence of a predetermined atmospheric air temperature.

* * * * *